United States Patent [19]
Garrison

[11] 3,934,394
[45] Jan. 27, 1976

[54] CONTINUOUS FEEDING FOR STACK FORMING LOADERS

[75] Inventor: Harold Keith Garrison, Newton, Kans.

[73] Assignee: Hesston Corporation, Hesston, Kans.

[22] Filed: Mar. 30, 1973

[21] Appl. No.: 346,593

Related U.S. Application Data

[63] Continuation of Ser. No. 196,631, Nov. 8, 1971, abandoned.

[52] U.S. Cl. .................................. 56/344; 100/220
[51] Int. Cl.² .......................................... A01D 87/10
[58] Field of Search ................. 56/341, 343–347, 56/350–351; 100/187, 220, 271; 214/519–522

[56] References Cited
UNITED STATES PATENTS

| 523,707 | 7/1894 | Keith | 56/341 |
|---|---|---|---|
| 2,691,340 | 10/1954 | Nikkel | 100/187 |
| 3,556,327 | 1/1971 | Garrison | 214/522 |
| 3,744,228 | 7/1973 | Lundahl | 56/344 |

Primary Examiner—Hugh R. Chamblee
Assistant Examiner—J. N. Eskovitz
Attorney, Agent, or Firm—Schmidt, Johnson, Hovey & Williams

[57] ABSTRACT

In the stacking of hay or other crops, a windrow or swath is lifted off the ground, fed into a pile collected by a vehicle-supported, stack-forming body and the pile compressed from time to time in the body, all in a continuous operation as the vehicle is advanced across the field, by virtue of the provision of an accumulator which receives the crop while the pile is being compressed, and from which accumulator the crop so accumulated is thereupon dumped onto the compressed pile as the latter is held against expansion by a holding assembly.

33 Claims, 11 Drawing Figures

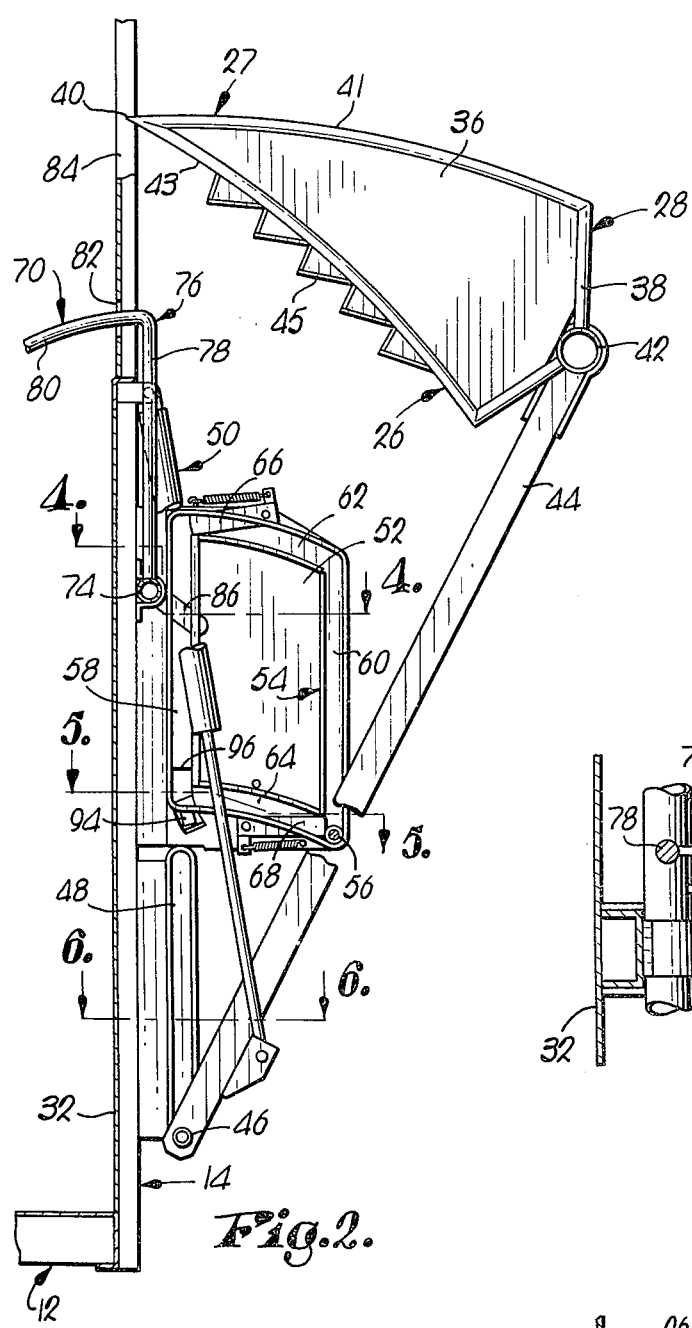
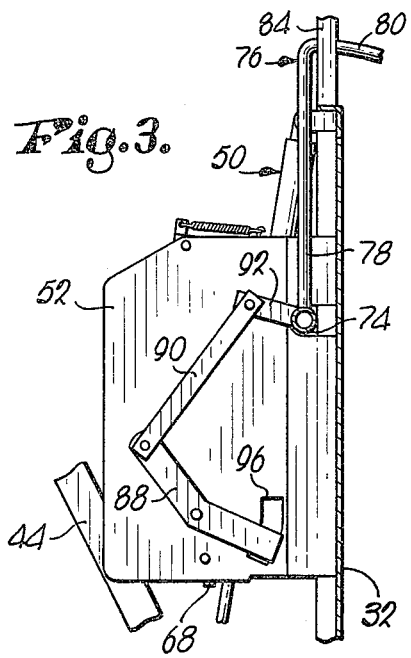
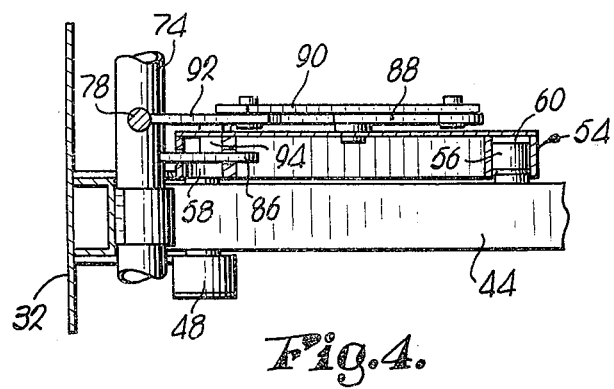
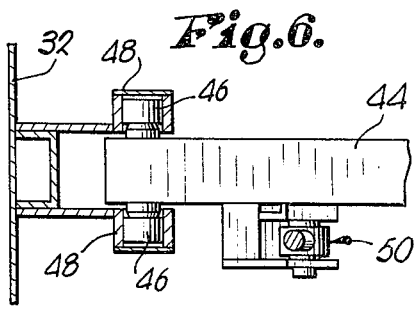
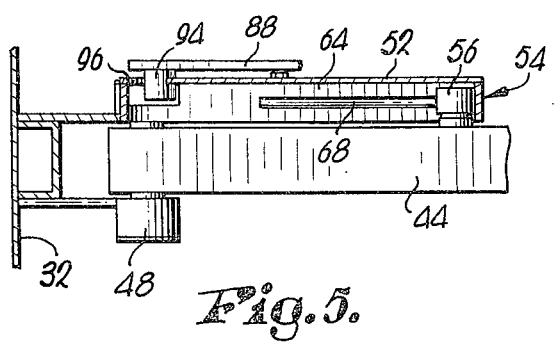

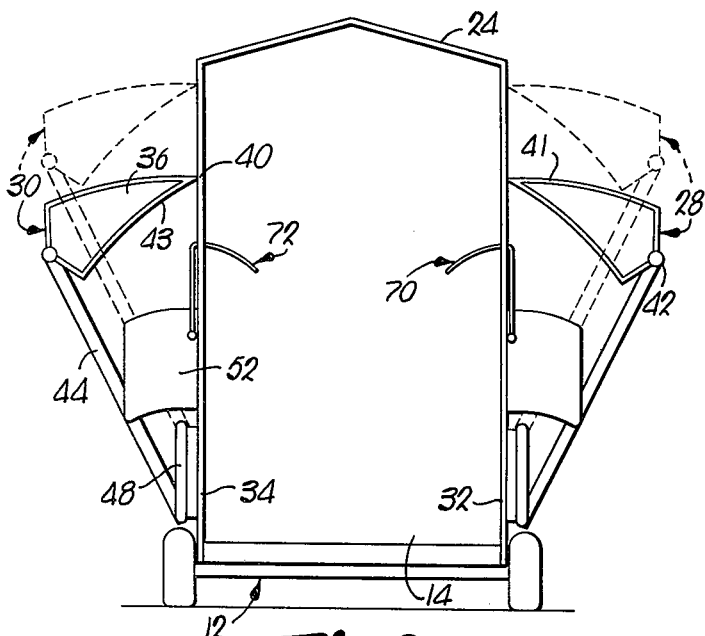
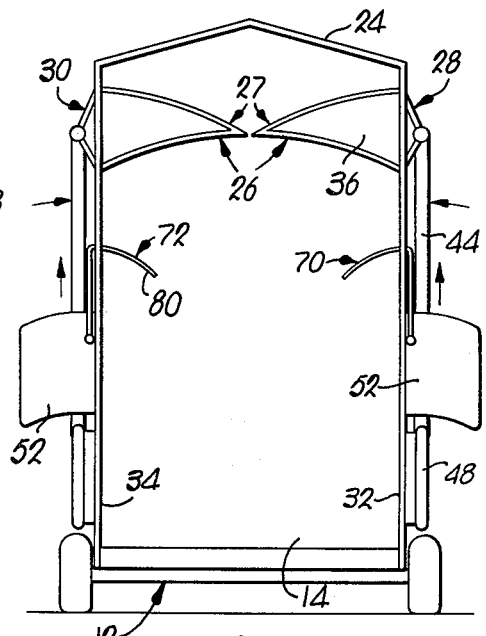
Fig.8.     Fig.9.
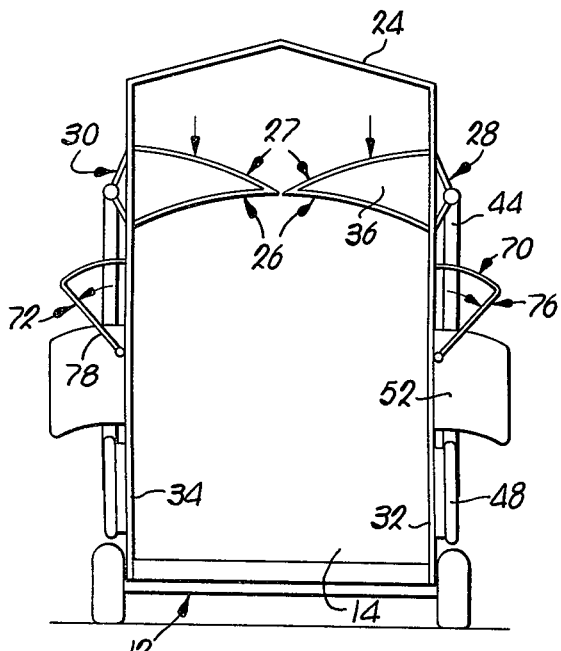
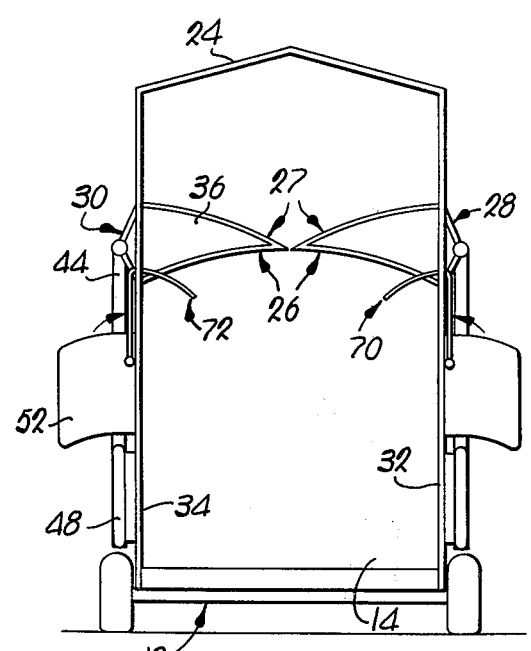
Fig.10.     Fig.11.

CONTINUOUS FEEDING FOR STACK FORMING LOADERS

This is a continuation of application Ser. No. 196,631, filed Nov. 8, 1971 and now abandoned.

This invention relates to co-pending applications Ser. No. 876,944 filed Nov. 14, 1969; Ser. No. 82,900 filed Oct. 22, 1970; and Ser. No. 139,391 filed May 3, 1971, and has as an important object to improve upon the inventions disclosed in said applications and in my U.S. Pat. No. 3,556,327 issued Jan. 19, 1971, entitled "Loose Hay Wagon."

The most important object of the present invention is to provide for periodic compression of a crop within a vehicle-supported, stack-forming body without interrupting the flow of the crop as the vehicle travels across the field and continuously picks the crop off the ground.

Another important object of my present invention is to provide for crop accumulation while pressing takes place such that the crop so accumulated may be easily and quickly discharged to the stack being formed in the body after each pressing operation, and the feeding into the body thereupon continued without stopping or slowdown.

Still another important object of the instant invention is to provide for continuous feeding, pressing and accumulation in a sequence which will not only compress each accumulation into the stack after its discharge, but properly compress additional collections into the stack after each such discharge.

A further object of the present invention is to provide a way to introduce a stack holding function into the sequence such as to prevent expansion of the stack after each pressing operation.

A still further object of my instant invention is to incorporate the accumulator and stack holding assembly into the press in such manner as to be actuated thereby and, therefore, as to be synchronized in proper sequence, substantially reducing operator work and attention.

In the drawings:

FIG. 3 is a fragmentary cross-sectional view similar to FIG. 2 looking forwardly;

FIGS. 4–6 are fragmentary cross-sectional views taken on lines 4—4, 5—5 and 6—6 respectively of FIG. 2;

FIG. 7 is a fragmentary cross-sectional view taken on line 7—7 of FIG. 1; and

FIGS. 8–11 are schematic end views showing the sequence of operation.

Figure 1:
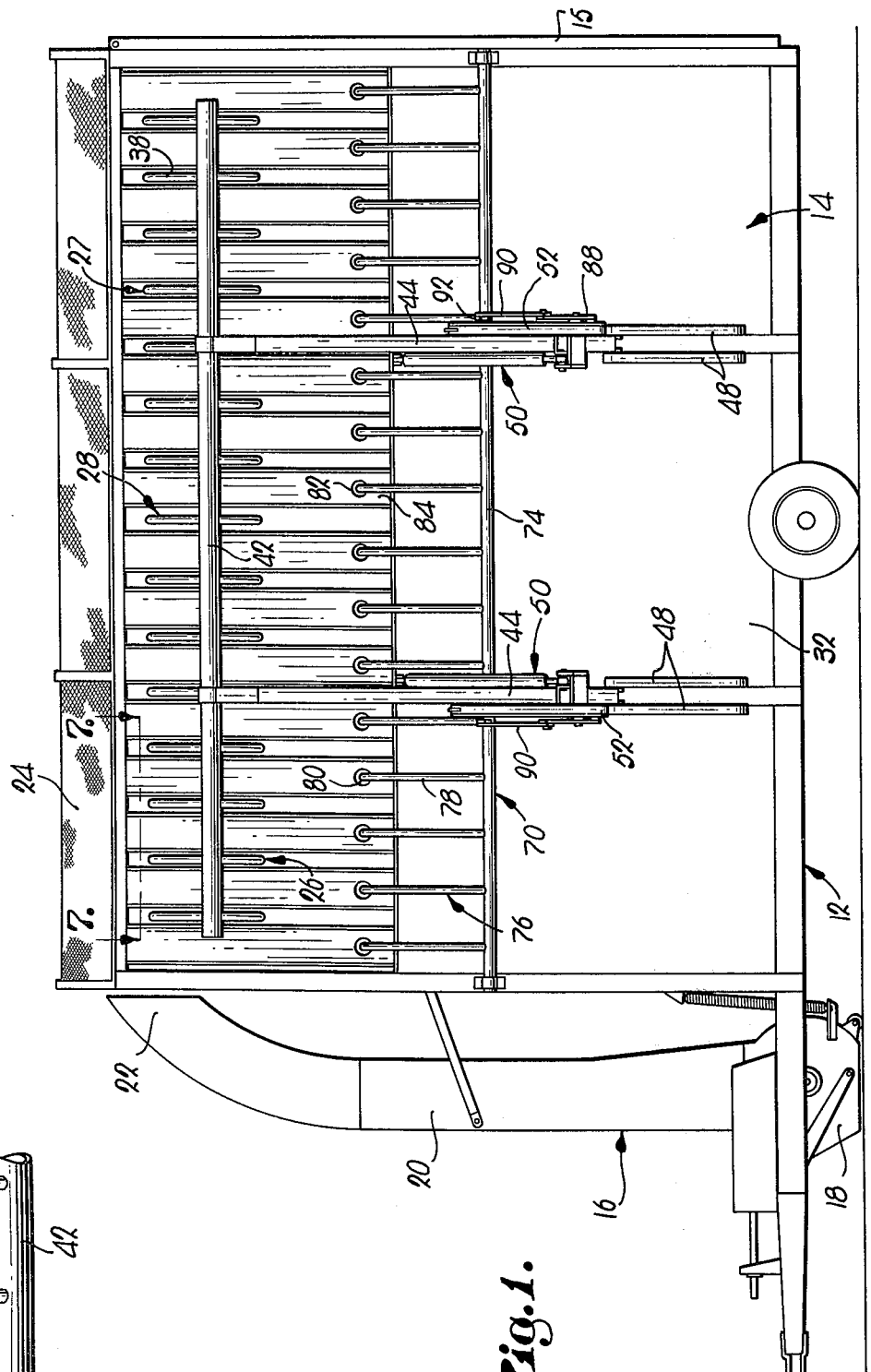
FIG. 1 is a side elevational view of a stack forming loader embodying continuous feeding in accordance with the present invention.

A vehicle 12 may be self propelled if desired, but as shown in FIG. 1, it is in the nature of a wheeled, tractor drawn trailer having a stack forming body 14, provided with an upwardly swingable rear endgate 15, and adapted to receive windrowed crops from a feeder 16 as the vehicle 12 is continuously advanced across a field. Feeder 16, as illustrated, is the same as disclosed in Ser. No. 82,900 aforementioned, but for the purposes of the principles of the present invention, may be of any desired type, e.g., the crop pickup and feeding assembly of U.S. Pat. No. 3,556,327 above referred to.

Suffice it to point out, therefore, that feeder 16 has a vaned rotor within a housing 18 carried by vehicle 12, capable when driven from the power take-off of the tractor of picking up the crop and creating sufficient air movement to continuously project the crop upwardly through conduit 20 and thence rearwardly from outlet spout 22 into body 14. An arched roof 24 may be provided for body 14 if desired, and a suitable inlet opening in the front end of body 14 immediately below roof 24 receives the crop from spout 22.

As in U.S. Pat. No. 3,556,327, the crop collected in body 14 may be compressed from time to time to produce a compact stack of self-sustaining nature when subsequently unloaded through the rear end of body 14. To this end, a press 26 and an accumulator 27 have a pair of sections 28 and 30 on side walls 32 and 34 respectively of body 14. Sections 28 and 30 being identical, section 28 only will be described, but the same numerals will be provided to identify the component parts of both sections 28 and 30.

A row of identical, spaced apart, generally triangular plates 36, extending fore and aft of wall 32, having beads 38 around their peripheries, and terminating at pointed ends 40, are rigidly mounted on a common horizontal tube 42 disposed exteriorly of body 14. Upper crop accumulator edges 41 and lower crop compressing edges 43 of plates 36 converge toward ends 40, and edges 43 are provided with elongated sawtooth bars 45.

Tube 42 is secured rigidly to the upper ends of a pair of arms 44 and each of the latter has a pair of opposed rollers 46 (FIG. 6) at its lower end. Rollers 46 are reciprocable vertically within upright guide channels 48 mounted securely to wall 32 and having their upper and lower ends closed. A fluid pressure piston and cylinder unit 50 pivotally connects each arm 44 respectively with body 14.

Figure 2:
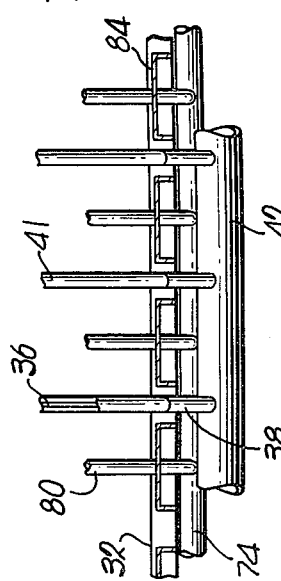
FIG. 2 is an enlarged, fragmentary, vertical cross-sectional view transversely through the body, looking rearwardly and showing one section of the press, accumulator and retainer.

A panel 52 for each arm 44 respectively, secured to wall 32 above the corresponding channels 48, has a track 54 which receives a rotatable cam 56 (FIGS. 2, 4 and 5). During actuation of units 50, the cams 56, carried by arms 44 intermediate their ends, travel (anticlockwise, viewing FIG. 2) along inner and outer, vertical stretches 58 and 60 respectively of tracks 54 and along upper and lower, upwardly arched segments 62 and 64 respectively of tracks 54.

Retrograde travel of cams 56 along upper segments 62 is precluded by the provision of upper spring-loaded latches 66 extending into the tracks 54 at the junctures between segments 62 and stretches 58. Similarly, retrograde travel of cams 56 along lever segments 64 is precluded by the provision of lower spring-loaded latches 68 extending into the tracks 54 at the junctures between segments 64 and stretches 60.

Walls 32 and 34 also carry retainers 70 and 72 respectively and here again, since they are identical, retainer 70 only will be described, with the same identifying numerals applied to the component parts of both retainers 70 and 72. A shaft 74, parallel with tube 42, is supported for oscillating on wall 32, and has a row of spaced, generally L-shaped hooks 76 thereon. Each hook 76 includes an upstanding shank 78 terminating in an inwardly extending fork 80 at its upper end.

Clearance openings 82 (FIG. 2) for forks 80 are provided in posts 84 which extend between wall 32 and roof 24, posts 84 being spaced apart to clear the plates 36 (FIG. 1). Radial cranks 86, rigid to shaft 74, are swingable therewith to and from the position shown in FIGS. 2 and 4 across cam stretches 58 within the path of descent of the cams 56.

Each panel 52 has a link 88 vertically swingable thereon and pivotally connected by a connector 90 with a radial projection 92 rigid to shaft 74. An ear 94 on link 88 extends through an arcuate slot 96 in panel 52 at the lower end of cam stretch 58 for engagement by cam 56 as the latter rounds the corner from cam stretch 58 to cam segment 64.

OPERATION

The pickup within housing 18 lifts the crop off the ground and blows it through conduit 20 and spout 22 rearwardly into body 14 above walls 32 and 34 and below roof 24 toward endgate 15 as vehicle 12 traverses the field. Inasmuch as this operation may be the same as disclosed in U.S. Pat. No. 3,556,327 aforementioned, showing an embodiment capable of functioning in this manner, said patent is incorporated herein by reference as need be, and made a part hereof for a full understanding of the present invention.

At this time the sections 28 and 30 of press 26 and accumulator 27 are withdrawn outwardly as shown by full lines in FIG. 8 such that the crop entering between the two rows of posts 84 gravitates into and is collected by the body 14. After a pile is collected, which may rise as high as roof 24, or nearly so, the operator causes actuation of units 50, without stopping the advancement of vehicle 12 or the flow of the crop through spout 22, to cause rollers 46 and cams 56 to rise simultaneously in channels 48 and cam stretches 60 respectively. This raises arms 44 and plates 36 to the dotted line position shown in FIG. 8.

When rollers 46 thus reach the upper ends of channels 48 and cams 56 reach the upper ends of cam stretches 60, continued operation of units 50 causes arms 44 to swing toward body 14 about the axes of rollers 46 as cams 56 travel along cam segments 62 toward cam stretches 58. This extends the plates 36 through the spaces between posts 84 until opposed points 40 are juxtaposed, with edges 43 of press 26 overlying the pile of hay and the edges 41 of accumulator 27 underlying roof 24. Accumulator 27 thereby intercepts the gravitating crop still emanating from spout 22 and commences accumulating the same on edges 41.

Cams 56 raise the latches 66 as they approach stretches 58 and after cams 56 enter the upper ends of stretches 58, the springs of latches 66 return the latter to the position shown in FIG. 2 so that, upon reversal of units 50, cams 56 must descend along stretches 58. In their descent, cams 56 strike cranks 86 to swing shafts 74 clockwise, viewing FIG. 2, withdrawing the forks 80 as shown in FIG. 10.

At this time the press 26 will have commenced to compress the pile of hay in the body 14, as shown in FIG. 10, because of the action of edges 43 against the top of the pile. The pressing action of edges 43 and the accumulating function of edges 41 continue while plates 36 move down to the position shown in FIG. 11 and the cams 56 move to the lower ends of stretches 58.

While the cams 56 are still in the stretches 58 they depress the ears 94 to swing the links 88 clockwise, viewing FIG. 3, reinserting the forks 80 through openings 82 into the compressed pile of hay and essentially thereabove as shown in FIG. 11, which also shows plates 36 at the lower ends of their paths of travel in body 14.

As rollers 46 return to the position shown in FIG. 2, units 50 operate to swing arms 44 outwardly about the axes of rollers 46, and shift cams 56 off the ears 94 and along segments 64 to withdraw the plates 36 to the positions shown in FIGS. 2 and 8, leaving forks 80 in position for retaining the compressed pile against expansion while the press 26 is retracted. Cams 56 raise the latches 68 as they travel along segments 64. When the cams 56 reach the position shown in FIG. 2, the latches 68 are pulled by their springs behind cams 56 so that the latter will be restrained against retrograde movement in segments 64 as units 50 are again actuated to raise the cams 56 in stretches 60.

The press 26 is preferably arched upwardly, as shown, to produce a desired crown on the finished stack capable of shedding water. Thus, the crop tends to be moved away from the walls 32 and 34 toward the fore and aft longitudinal center of body 14 during compression. The sawtooth bars 45 on the press edges 43 function to obviate an undue amount of such inward movement of the crop.

Retraction of accumulator 27 dumps the hay which it accumulated during compression, and such accumulation drops onto the compressed pile being held by forks 80. Thereupon, and again without interruption, the crop coming from spout 22 gravitates onto the accumulation just previously dropped. During the next operation of units 50, both the dropped accumulation and the collection thereupon will be compressed into the pile previously compressed. These operations may be repeated from time to time as desired or necessary, while the vehicle 12 moves along the windrows until the body 14 is loaded and a complete, fully compressed stack is formed.

The stack may then be either unloaded in the field or transported to any other desired location, whereupon the endgate 15 is opened, as in the pending applications aforementioned, or otherwise, and the stack discharged from the rear open end of body 14. Here again, reference may be made to U.S. Pat. No. 3,556,327 for an understanding of one suitable way of carrying out the unloading operation.

Prior to transport, the cams 56 may be placed into stretches 58 above cranks 86 so that the forks 80 and the plates 36 are all in their inner positions. Then, just prior to unloading, the cams 56 are lowered to retract the forks 80. Before cams 56 reach ears 94, cams 56 are raised to the tops of stretches 58 so that the pressure of press 26 on the stack is relieved. After unloading, the cams 56 are again placed in the position shown in FIG. 2 before the loading operation is resumed to form another stack.

Having thus described the invention, what is claimed as new and desired to be secured by Letters Patent is:

1. In a stacking machine:
   a crop feeder;
   a stack forming body for receiving the crop from said feeder; and
   a press, vertically reciprocable rectilinearly for compacting the crop received by said body,
   said press having means for accumulating the crop emanating from the feeder during each successive vertical descent of the press,
   said press being retractable from beneath the accumulated crop after the press reaches its lowered position for discharging each crop accumulation into the body after each compaction.

2. A stack forming machine as claimed in claim 1; and means for holding the compacted crop against expansion while the accumulated crop is being discharged into the body and while an additional quantity of said crop is fed onto the compacted accumulation.

3. A stacking machine as claimed in claim 1 wherein said crop gravitates from the feeder into the body and said accumulating means is swingable laterally of its path of vertical movement to and from a position intercepting the crop gravitating from the feeder.

4. A stacking machine as claimed in claim 3 wherein said crop gravitates from the feeder into the body and said accumulating means is disposed to intercept the crop gravitating from the feeder during vertical descent of the compacting means against the crop in the body.

5. A stacking machine as claimed in claim 4 wherein said accumulating means swings laterally into the body with the compacting means and thereupon, without further swinging, the same descend together vertically.

6. A stacking machine as claimed in claim 5 wherein said compacting means and said accumulating means are retractable laterally without vertical movement from between the compacted crop and the accumulated crop after compaction whereby the latter is released onto the compacted crop.

7. A stacking machine as claimed in claim 6; and means swingable laterally to a position over the top of the compacted crop prior to said retraction for holding the compacted crop against upward expansion while the accumulated crop is being released.

8. In a stacking machine:
a crop feeder;
a stack forming body for receiving the crop from said feeder; and
a press, swingable laterally into and out of the body, shiftable downwardly in the body along a linear path for compacting the crop from time to time in the body as the crop is being fed thereinto and shiftable upwardly outside the body along a linear path toward a position for beginning the next compacting stroke,
the axis of swinging movement of the press being vertically shiftable with the latter during its vertical travel,
said press being provided with an accumulator swingable and reciprocable therewith for receiving the crop from the feeder during each compaction, and said body being provided with means for releasing the accumulated crop from the accumulator to the compacted crop after each compaction as the press is swung laterally out of the body.

9. A stacking machine as claimed in claim 8 wherein the press and its accumulator are swingable from between the compacted crop and the accumulated crop after the press and accumulator have reached the end of each downward stroke.

10. A stacking machine as claimed in claim 9 wherein said press and its accumulator are disposed exteriorly of the body when retracted and the same are raised prior to each swinging movement into the body.

11. A stacking machine as claimed in claim 8 wherein, at the cessation of each vertical stroke of the press and its accumulator, the same are swung into or out of the body about a generally horizontal axis.

12. In a stacking machine:
a crop feeder;
an elongated stack forming body for receiving the crop from said feeder;
a vertically reciprocable and horizontally swingable press having its axis of swinging movement vertically shiftable during said reciprocation;
power means operably coupled with said press for effecting said reciprocation thereof; and
structure coupled with the press for guiding the latter through a closed loop of travel during said reciprocation in which loop the press is sequentially raised linearly, then swung arcuately to a position above a predetermined quantity of said crop previously fed into the body, thereupon lowered linearly while it is in said position to compact said quantity of the crop, and then retracted arcuately from said position.

13. A stacking machine as claimed in claim 12, said press being disposed within the body at all times during descent while the same is in said position and exteriorly of the body at all times during ascent while the press is retracted.

14. A stacking machine as claimed in claim 13, said press having an accumulator movable therewith, said accumulator being disposed to receive the crop being fed into the body while the press is in said position and disposed exteriorly of the body when the press is retracted to deposit the crop accumulated thereby onto the compacted quantity of said crop, said press and accumulator including a series of spaced elements extending longitudinally of the body throughout the length thereof.

15. A stacking machine as claimed in claim 14; and a series of spaced retention devices extending longitudinally of the body throughout the length thereof, responsive to vertical movement of said elements and shiftable to a position above the compacted crop for holding the latter against expansion while the elements are retracted.

16. A harvesting machine including a vehicle adapted for continuous advancement across a field having a crop thereon, said vehicle being provided with:
a crop receiving body;
apparatus for lifting the crop off the field and feeding the same into said body as the vehicle is advanced;
a compressor for compacting the crop from time to time as the crop builds up in the body to produce a stack conforming substantially in size and shape with the body;
means operable after compaction for releasing into the body that portion of said crop emanating from said apparatus and accumulating on the compressor during compaction; and
means restricting the compression to linear descent along a vertical path during compaction.

17. A harvesting machine as claimed in claim 16 wherein said compressor is also swingable about a horizontal axis rendering the same extensible into the body prior to compaction to a first position overlying the crop built up in the body, and retractable out of the body after compaction to a second position releasing the accumulation.

18. A harvesting machine as claimed in claim 17; and means movable into the body from opposed sides thereof after compaction to a position overlying the compacted crop for holding the latter against expansion after retraction of the compressor.

19. In a stack producing method:
feeding a crop into an elongated pile;

compacting the entire pile throughout the length thereof to increase the density thereof;

accumulating all of the crop being fed throughout the time said pile is being compacted; and discharging all of the accumulated crop to the pile after it has been compacted.

20. A stack forming method as claimed in claim 19; and compacting the discharged accumulation into said pile throughout the length of the latter.

21. A stack forming method as claimed in claim 20 wherein said crop gravitates into said pile for a prolonged period of time prior to compaction.

22. A stack forming method as claimed in claim 21 wherein said accumulated crop gravitates onto the compact pile throughout the length of the latter upon discharge of the accumulated crop.

23. A stack forming method as claimed in claim 22 wherein the compaction is linear and downwardly against said pile and against the accumulation thereon.

24. In a harvesting method:

continuously lifting a crop off a field;

dropping the lifted crop into a pile and transporting the latter while the crop is being lifted;

exerting a continuous, steady, linear pushing or thrusting force or pressure downwardly throughout the entire upper surface of said pile to condense the latter into a single, compact unit during continuous lifting and feeding of the crop and during continuous transportation of the pile;

continuously accumulating the fed crop above the pile during condensation of the latter; and releasing the accumulation for gravitation onto said unit while continuing to transport the latter and without interrupting said lifting or said feeding of the crop.

25. In a harvesting method as claimed in claim 24; and compressing said released accumulation against said unit to combine the same therewith.

26. In a harvesting method as claimed in claim 24; and proceeding, while interrupting the condensation step, to feed the crop into the body during continued transportation for collection upon said released accumulation.

27. In a harvesting method as claimed in claim 24; and compressing said collection and said released accumulation against the crop in the body to form a unitary stack.

28. A harvesting machine including a vehicle adapted for continuous advancement across a field having a crop thereon, said vehicle being provided with:

an elongated crop receiving body having front and rear ends and opposed sides;

apparatus for lifting the crop off the field and feeding the same through the front end of the body for gravitation into the latter;

a row of spaced compressor elements extending along each of said sides respectively of the body throughout the length and exteriorly of the latter;

means mounting said elements for upward, vertical movement after the body is filled with the crop, thence inwardly into the body along an arcuate path to a position above the crop, then downward, vertical movement against the crop to compact the latter, and thereupon outwardly out of the body along an arcuate path to a position exteriorly of the body.

29. A harvesting machine as claimed in claim 28, the elements along one of said sides meeting with the elements along the other of said sides when the elements are within the body, presenting a barrier for accumulating crop emanating from said apparatus during said downward movement of the elements.

30. A harvesting machine as claimed in claim 29; a row of spaced holding members extending along each of said sides respectively of the body throughout the length and exteriorly of the latter; and means mounting said members for swinging movement inwardly into the body into overlying relation to the compacted crop for maintaining the latter in its compacted condition after withdrawal of said elements from the body.

31. In a stack producing method:

continuously feeding loose crop material into an elongated container without compacting the material until the latter is filled;

thereupon exerting a continuous, steady, linear pushing or thrusting force or pressure downwardly within the container against the loose crop therein throughout the entire upper surface thereof to compress the same into a compact unit while continuing to feed additional loose crop material into the container;

loosely accumulating said additional material in the container while compaction of said unit and feeding of additional loose material continues without interruption;

withdrawing said pressure and simultaneously discharging said accumulated loose material on top of the compact unit without interrupting said feeding;

continuing said feeding until the container is again filled; and repeating the compressing step to combine the loose material with the compact unit, forming a composite stack.

32. A hay wagon comprising:

a receptacle for receiving loose hay, a compacting mechanism reciprocally supported by at least one side of the receptacle for periodically engaging and compressing hay, power means for generally vertically lowering and elevating the compacting mechanism in respect to hay in the receptacle and in respect to said spaced sides causing the compacting mechanism to engage and compact hay when lowered, means for continuously picking up loose hay from a ground-engaging position while simultaneously compacting the hay, and for intermittently delivering the picked-up hay into said receptacle for compacting.

33. A crop wagon comprising:

a bed for receiving a crop;

a compactor disposed remotely above the bed;

a crop delivery unit for picking up the crop from a field and delivering it to and spreading it along the bed;

power means for reciprocating the compactor between said remote disposition and a contiguous compacting relation with the crop within the wagon;

crop accumulator means interposed between the delivery unit and the bed to temporarily store the incoming crop while the compactor moves between its remote and compacting positions and thereafter deliver the stored crop to the bed, thereby accommodating continuous pick up of the crop from the field concurrent with compaction of the crop on the bed.

* * * * *